US006404889B1

(12) United States Patent
Ryan et al.

(10) Patent No.: US 6,404,889 B1
(45) Date of Patent: Jun. 11, 2002

(54) PROTECTION OF A COMPONENT VIDEO SIGNAL

(75) Inventors: John O. Ryan, Cupertino; Kordian J. Kurowski, San Jose; Ronald Quan, Cupertino, all of CA (US)

(73) Assignee: Macrovision Corporation, Sunnyvale, CA (US)

( * ) Notice: Subject to any disclaimer, the term of this patent is extended or adjusted under 35 U.S.C. 154(b) by 0 days.

(21) Appl. No.: 08/949,274

(22) Filed: Oct. 13, 1997

Related U.S. Application Data

(60) Provisional application No. 60/051,312, filed on Jun. 30, 1997, and provisional application No. 60/056,570, filed on Aug. 21, 1997.

(51) Int. Cl.[7] .................................................. H04N 7/16
(52) U.S. Cl. ........................ 380/201; 380/201; 380/204; 380/210; 380/221
(58) Field of Search ................................ 380/54, 10, 3, 380/7, 11, 201, 204, 210, 221

(56) References Cited

U.S. PATENT DOCUMENTS

| 4,179,705 A | | 12/1979 | Faroudja | 358/31 |
| 4,325,079 A | * | 4/1982 | Little | 358/120 |
| 4,617,597 A | | 10/1986 | Lippel | 358/310 |
| 4,641,186 A | | 2/1987 | Pritchard | 358/105 |
| 4,965,825 A | * | 10/1990 | Harvey et al. | 380/9 |
| 5,504,815 A | * | 4/1996 | Ryan et al. | 380/11 |

FOREIGN PATENT DOCUMENTS

| WO | 97 15142 | 4/1997 |
| WO | 94 24828 | 10/1998 |

* cited by examiner

*Primary Examiner*—Thomas R. Peeso
*Assistant Examiner*—Todd Jack
(74) *Attorney, Agent, or Firm*—Skjerven Morrill MacPherson LLP; Norman R. Klivans

(57) ABSTRACT

A VGA (or other component video signal) output, e.g. from a computer or DVD player, is protected so it is viewable on a VGA monitor. However, if the component video signal is converted to composite video (e.g. television) the resulting television picture is of substantially degraded quality, thereby inhibiting viewing and/or copying. This protects for instance copyrighted material in the VGA format from unauthorized use. The protection involves modifying the horizontal or vertical synchronization signals in the VGA video in such a way that there is no adverse affect on a typical VGA monitor. However, most or all VGA to television converters and/or television sets and VCR's suffer from loss of synchronization, resulting in an unviewable picture. Also, methods and circuits for defeating the copy protection are provided.

41 Claims, 10 Drawing Sheets

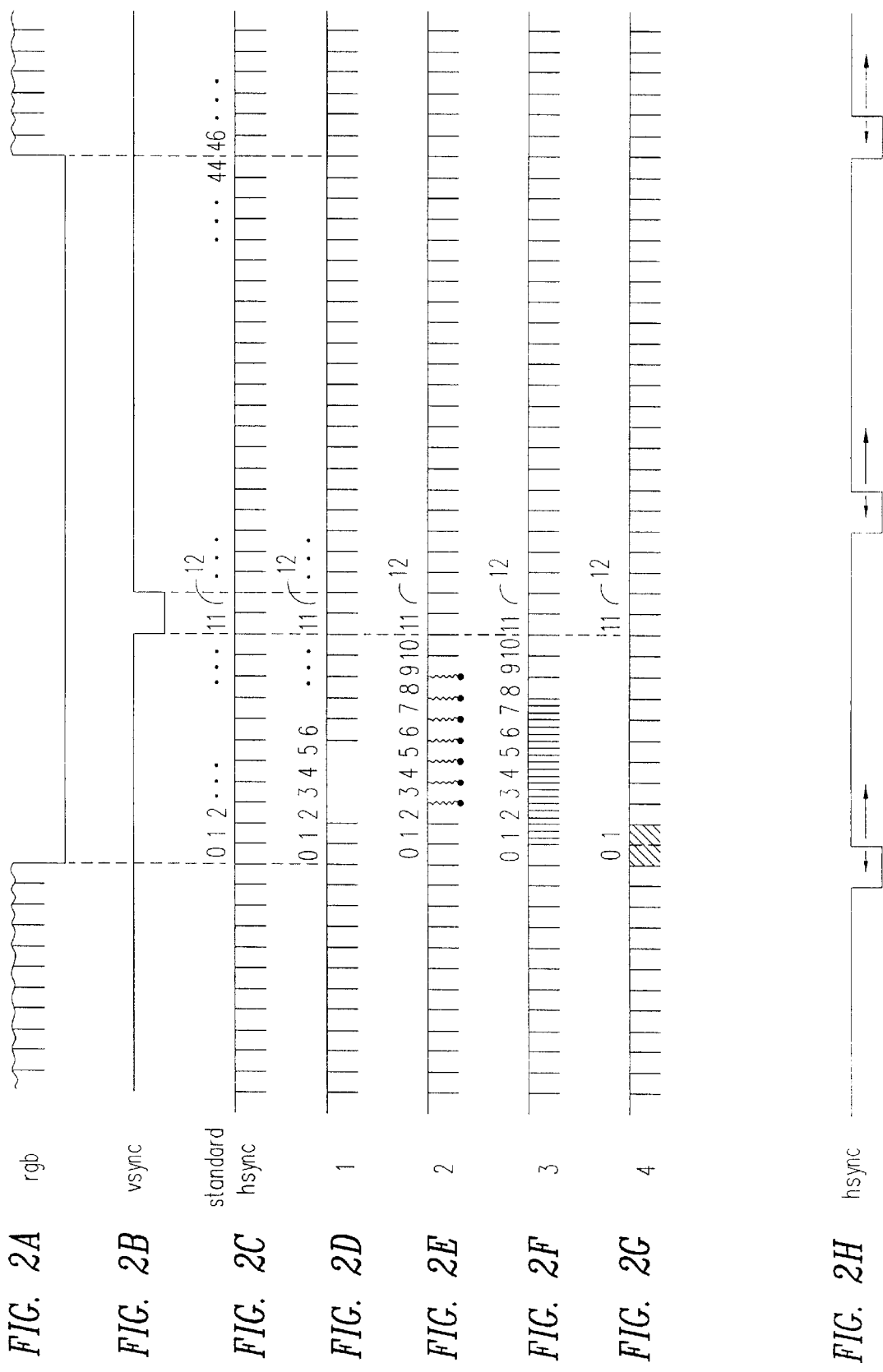

PROTECTION OF A COMPONENT VIDEO SIGNAL

CROSS REFERENCE TO RELATED APPLICATION

This application claims priority to U.S. provisional application Ser. No. 60/051,312, filed Jun. 30, 1997, "A VGA Copy Protection System and Method", John O. Ryan et al. and to provisional application Ser. No. 60/056,570, filed Aug. 21, 1997.

FIELD OF THE INVENTION

This invention relates to video signal protection and more specifically to such protection for component video.

BACKGROUND OF THE INVENTION

With the advent of the Digital Video Disc (DVD) format, manufacturers and users of personal computers are incorporating the ability to playback movies or other recorded material recorded on DVD's via the personal computer. Copy protection measures are being incorporated within these computers to protect the analog (NTSC or PAL television) video output from such a device. This is being done by incorporating bits within the digital stream on the DVD to instruct a digital to analog converter and NTSC (or PAL) encoder integrated circuit to incorporate copy protection pulses onto the analog video output signal. The copy protection techniques being used on the analog output include e.g. those in U.S. Pat. Nos. 4,631,603; 4,819,098; 4,577,216; and U.S. patent applications Ser. No. 08/784,876 filed Jan. 16, 1996; and International applications PCT/US96/17719, filed Nov. 5, 1996, and PCT/US97/05095 filed Mar. 25, 1997, all assigned to Macrovision Corporation and incorporated herein by reference.

A computer display uses a VGA (or similar or equivalent) output signal of the computer. This VGA output signal ("component video") is provided on a multiwire bus that provides separately a red video signal, a green video signal, a blue video signal, a set of vertical synchronizing pulses and a set of horizontal synchronizing pulses. The frame rate (refresh rate) is usually 60 frames per second. VGA does not require any one format (resolution) in terms of pixels per line or lines per frame or refresh rate; a variety of pixels per line and lines per frame are accommodated within the VGA standard.

There has been a growing after market for VGA to NTSC (or PAL) converters that take the VGA signal described above and convert it into an NTSC or PAL (composite) video signal for display on a regular TV monitor, TV set or video projector. With such a converter device connected to receive a VGA output signal, a user converts the VGA output signal to an NTSC or PAL output signal and then can record the NTSC/PAL output signal using a conventional VCR (video cassette recorder), thus circumventing the analog copy protection described above. While the video quality of such a conversion may be inferior, that may not deter a determined pirate.

SUMMARY

Therefore there is a need for protection of a VGA video signal that meets the usual requirements for an effective video protection system. A useful video protection system meets two basic requirements. First any copy made must result in an inferior quality picture. This is called effectiveness. In this case, a user who connects a video cassette recorder to a VGA to NTSC (PAL) converter must get a signal therefrom of inferior entertainment quality. Tearing of the picture, amplitude variation or loss of color are examples of inferior entertainment quality. The counterbalancing requirement is that the VGA signal when viewed on a VGA monitor must be totally "playable", e.g. not display any artifacts in the picture. The present protection technique balances these two requirements.

The present VGA protection method modifies at least one of the synchronization ("sync") pulse trains that are part of the VGA video signal. These modifications include deletion and/or addition of certain sync pulses, changing of the duty cycle of certain pulses, and switching between one or more of the above methods on a fixed, psuedo-random or random basis on various frames of the video signal. The additions and/or deletions can be in the vertical blanking intervals or the horizontal blanking intervals of the VGA video signal.

Thus in accordance with this invention, VGA video signals are protected from copying (or even from viewing) after being subject to NTSC/PAL conversion by modifying at least one of the horizontal and/or synchronization pulse trains that are part of the VGA video signal. In this context "VGA" refers to the well known Video Graphics Array video standard commonly used in the computer field and also to the associated SVGA and IBM's XVGA standards, which for purpose of this invention are the same.

Moreover, while one embodiment is directed to VGA signals provided from a DVD player installed in a computer, clearly the invention is not so limited and generally applies to VGA video signals whether output from a DVD player installed in a computer, other types of digital video players, or to any type of component computer video output. Of course, it is to be understood that a typical application is to copy protect copyrighted material, which is typically movies provided on DVD, but the invention is not so limited.

Hence in accordance with the invention, in one embodiment the horizontal sync pulses in the vertical blanking interval of a VGA signal are modified. The resulting modified VGA signal is readily viewable on any VGA monitor. However, if this signal is converted to an NTSC/PAL signal by one of the well known commercially available VGA to NTSC/PAL converters, the resulting signal is relatively unviewable on a NTSC/PAL television or television monitor. Also, if an attempt is made to copy this signal for instance using a conventional NTSC/PAL VCR (video cassette recorder), the resulting recording is also unviewable. By unviewable is meant a picture exhibiting artifacts, as described above, which substantially degrade the resulting picture when displayed on the television set.

It has been found that the most advantageous modifications to the sync pulses in accordance with this invention are to modify the horizontal sync pulse in the first part of the vertical blanking interval, e.g. prior to the occurrence of the vertical sync pulse. This typically means in the first 10 lines of the vertical blanking interval (VBI). Also, it has been found that in general it is undesirable to have a net increase in the total number of horizontal sync pulses in the VBI in any one video frame since this tends to adversely affect some VGA monitors.

Hence in one embodiment, one or more horizontal sync pulses are deleted from the first part of the vertical blanking interval. For increased effectiveness of the copy protection, one horizontal sync pulse is added, but in a place where such a horizontal sync pulse is not normally present, e.g. in the middle of a particular horizontal video line. The pattern by which horizontal sync pulses are deleted and/or added may be the same in every frame, or may vary from frame-to-frame. If it varies, the variation may be a fixed pattern, a pseudo-randomly varying pattern, or a randomly varying pattern. The varying patterns have been found to increase copy protection effectiveness. In another embodiment, the number of horizontal sync pulses is increased by adding several horizontal sync pulses to each line, for instance in the first portion of the vertical blanking interval. As mentioned above, with some VGA monitors, this degrades playability.

Other patterns for removal and/or addition of horizontal sync pulses are also possible.

Also in accordance with other embodiment, the vertical sync signal is altered, but this has been found to affect some VGA monitors adversely.

Also in accordance with the invention, a particular modification pattern to the sync pulses is dependent upon the characteristics of the attached VGA monitor. This is possible because in the computer environment, it is possible for the computer to "know" the characteristics of the attached VGA monitor as supplied by the user. In this case, the particular modification pattern may be set adaptively to accommodate the particular VGA monitor so as to minimize adverse affects on playability. Also, the present VGA copy protection scheme may be turned on or off either by content present in the source video material, e.g. on the DVD, or otherwise. This turning on and off may be either only to protect certain (copyrighted) material or may be done to increase the effectiveness of the anti-copy protection scheme by periodically switching between different versions of the process and/or by turning it on and off, thus further confusing any VGA to NTSC/PAL converter.

It should be noted that while some VGA to NTSC converters will produce a static response to a particular version of the present protection signal, a majority of converters exhibit picture tear dynamically or produce non-copiable results.

This static response to the protection signal may be in the form of a static picture shift and or static brightness change and/or static distortion (i.e. tear) in the picture when the output of the converter is connected to the TV set or VCR. However, this static response would be still copiable and viewable on a VCR and TV set. Therefore, to increase the annoyance factor, the particular protection signal may be turned off for a short time in a periodic or random fashion. By turning off the protection from time to time, the output of converter will have a dynamically shifted picture and/or dynamically distorted picture when connected to a TV set and/or VCR. This causes a more effective protection signal when the converter is connected to a VCR (and also a less viewable picture on the TV set).

Of course, it may be even more effective to affect a greater population of converters by alternating different protection processes in accordance with the invention along with turning off the protection from time to time.

While the references here to television typically are in terms of NTSC/PAL, other television standards, e.g. SECAM would also be vulnerable to the present modifications.

Also, circuitry is disclosed herein for suitably modifying the VGA video signal so that it contains the protection modifications. While several such embodiments are disclosed, it is to be understood that these are not limiting and a wide variety of other circuits would provide the desired modifications. Moreover, the circuits described herein only provide certain types of modifications, whereas a greater range of modifications in disclosed herein. It would be well within the skill of one of ordinary skill in the art to design and build circuitry to carry out the other types of modifications disclosed herein.

For example, the horizontal sync pulse modifications need not be restricted to the vertical blanking interval. Horizontal sync pulse train deletions and/or additions can be in the vicinity of the vertical blanking interval or anywhere in the field including in the active field. In some cases the horizontal sync pulse train is modified anywhere in the field by horizontal sync pulse splitting, pulse width modulation and the like. Also, vertical sync pulse train modifications can be made by adding pulses in the vertical sync pulse train. Other vertical sync pulse train modifications may include vertical sync pulse width modulation and/or splitting.

Because it is possible for the computer to be informed (or set by the user) as to which monitor is connected thereto, maximum copy protection effectiveness for VGA type converter boxes can be achieved with yet an additional copy protection signal. For instance, in certain monitors, the video clamp pulse may be coincident to the first 70% of the horizontal blanking interval of the red, green and blue video channels. Therefore, an additional copy protection method modifies the video channels with peak white pulses during the last 30% of the horizontal blanking interval.

Therefore in some cases an anticopy signal is inserted into at least a portion of the horizontal blanking interval (or in the vicinity of the horizontal blanking interval) over a sufficient number of lines of the component video signal (i.e. any combination of red, green, and/or blue). This anticopy signal may be an "AGC" pulse as described in U.S. Pat. No. 4,631,603, referred to above. Also, this anticopy signal can be a static and/or periodic and/or random and/or pseudo-random signal of various amplitudes and/or frequencies and/or phases and/or positions and/or widths.

Also, while the particular illustrated circuitry for providing these modifications is shown as isolated circuits, these circuits may be incorporated for instance on an integrated circuit which includes other functionality and which is installed in the computer which hosts the DVD player, or otherwise connected thereto. It is to be expected that in one commercial embodiment, the present circuitry is included in an integrated circuit associated with the DVD player and which performs other functions for controlling the DVD player and/or its output.

Additionally, a method of defeating such a protection scheme is disclosed herein, to protect the users of the protection (e.g. copyright owners) from unlicensed individuals that make, use and sell so called "defeat" devices. A similar pattern of copy protection technologies and corresponding defeat devices are known in the analog video copy protection technologies referred to above.

Therefore an associated protection defeat method and apparatus includes inputting the modified synchronizing pulses to a synchronizing generator that uses one or more of the modified pulse trains to generate a proper horizontal and vertical synchronizing pulse train. This proper pulse train when connected to a VGA to NTSC/PAL converter produces copiable NTSC/PAL video signals.

BRIEF DESCRIPTIONS OF THE DRAWINGS

FIGS. 2A to 2C show the same signals as FIG. 1.

FIGS. 2D to 2H show waveforms for four copy protection methods in accordance with the invention.

FIGS. 8, 9, 10, and 11 show diagrams of other copy protection defeat circuits.

DETAILED DESCRIPTION

As discussed above, the present protection of VGA (including SVGA or other component video output) comprises a modification of at least one of the synchronizing signals in the VGA output signal from e.g. a computer. The goal is to modify one or both of the sync pulse trains to cause a VGA to NTSC (or PAL) converter to allow a recording that is totally lacking in entertainment value, without affecting the VGA display on the VGA computer monitor.

The following are distinguishing characteristics between such converters used in combination with TV sets/monitors and computer monitors pertinent to their horizontal scan (synchronization) circuits exploited in accordance with the invention.

1) In TV sets, the horizontal scans are driven by a fly-wheel oscillator (horizontal phase lock loop oscillator with relatively slow AFC response) that is immune to noise in the horizontal sync line.

2) In a computer monitor, the horizontal scan circuit does not always have flywheel circuits to reject noise as in TV sets. Instead, the computer monitor triggers an oscillator off an edge of the horizontal sync pulse. Triggered oscillators react almost instantaneously to even narrow pulse width noise spikes in the horizontal sync pulse train. There are some computer monitors that have flywheel oscillators but with much faster locking than TV sets. That is, the horizontal AFC (automatic frequency control) loop is slower in a TV set than in a computer monitor.

Since different VGA to NTSC/PAL converters are affected differently by different configurations of pulse modifications, another embodiment is to vary the implementation of the horizontal sync pulse train modifications over one or more frames to include combinations of the modifications so as to produce unviewable outputs of the VGA to NTSC/PAL converter on the entire population of known converters.

As discussed above, one application of the invention disclosed here is to provide a copy protected output of copyrighted material from DVD's. The individual DVD's already have "trigger bits" associated with their normal analog output signal. These trigger bits indicate to the copy protection circuit for the analog output of the computing device that the DVD is copy protected and should have the analog copy protection signals added.

These copy protection trigger bits can also be used in accordance with the invention to indicate to the present VGA output system to modify the sync pulse trains. When the user is viewing material that does not contain trigger bits, he is thus able to use a VGA to NTSC/PAL converter to make copies. It is only when such trigger bits indicating copy protected material are present that the VGA copy protection is activated.

Figure 1:
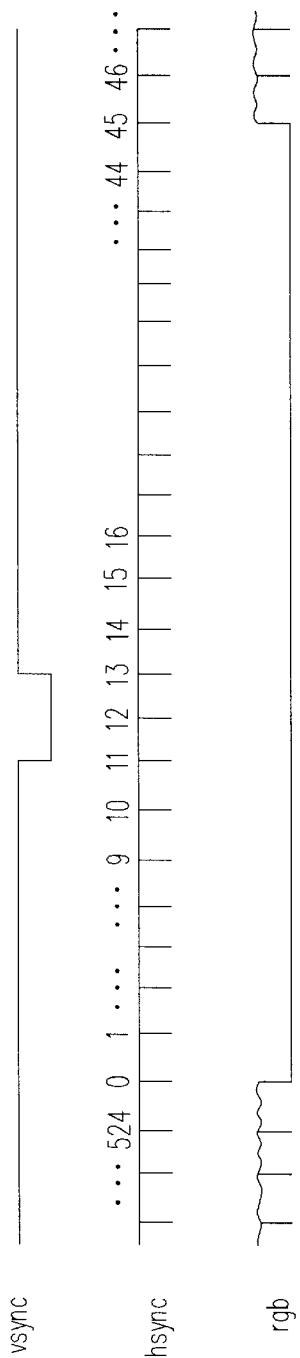
FIG. 1 shows the normal RGB and horizontal and vertical synchronizing signals of a VGA output signal of a computer.

FIG. 1 shows three waveforms that together represent one of the VGA standards, the 640 by 480, noninterlaced, 60 frames-per-second format. The top line is the vertical sync pulse. It is to be understood that these wave forms are only for a portion of one frame but show the entire vertical blanking interval (VBI) and a small portion of the frame prior to and subsequent to the VBI. As shown, in VGA the vertical sync train is one vertical sync pulse per VBI. With reference to the next waveform which is the corresponding horizontal sync pulses, with the horizontal lines numbered, the vertical sync pulse occurs between lines 11 and 13 of the VBI. In this case, the horizontal sync signals are shown as very narrow pulses. In actuality, they have a certain width, typically 3.77 microseconds. The vertical sync pulse is two lines wide and hence has a width of 63.5 microseconds. (This is for VGA having 525 lines per frame with a 60 frame per second refresh rate where 480 of the frames are active video; the remaining lines are in the VBI.) It is also to be understood that one NTSC horizontal scan line period corresponds to two VGA horizontal scan line periods.

The third waveform in FIG. 1 is the RGB signals, all three of which are shown combined since for the purposes of this invention there is no need to discuss each color separately. This shows the active video which of course has the "black" value during the period of the vertical blanking interval. The variations in the RGB signals indicate active video. Also, as shown, during the period of the horizontal sync signal, the RGB signals go down to the black level. It is to be understood that the RGB, horizontal sync and vertical sync signals shown in FIG. 1 do not include copy protection in accordance with this invention, but are shown for purposes of reference to those not familiar with the VGA format. As is conventional, the horizontal axis represents time and the vertical axis represents signal amplitude in terms of voltage.

Protection in accordance with this invention is understood with reference to FIGS. 2A–2G. FIG. 2A is the same as the RGB waveform in FIG. 1; FIG. 2B is the same as the vertical sync waveform in FIG. 1; FIG. 2C is the same as the horizontal sync waveform in FIG. 1. FIG. 2A–2C are for purposes of illustration to show which portions of the video signal are illustrated in FIGS. 2D–2G.

FIGS. 2D–2H illustrate five embodiments of a protection method in accordance with this invention in terms of the VGA waveforms output by the protection circuitry. These protection modifications all occur during the vertical blanking interval and, in fact, occur prior to the vertical sync signal, in the first 10 lines of the vertical blanking interval. This particular form of protection has been found to maximize playability (have the least affect on the universe of known VGA monitors), while providing relatively effective protection as described above. In FIGS. 2C–2G the horizontal lines are numbered so that the first line in the VBI is line 0 and the vertical sync signal occurs from lines 11 to 12 of the frame. The vertical blanking interval terminates at line 45 of the frame.

FIG. 2D shows a first protection method in accordance with this invention. In this case in this frame, three horizontal sync pulses are deleted, at lines 3, 4, and 5.

In the second method, shown in FIG. 2E, one horizontal sync pulse is deleted in each frame. As shown by the wiggly lines, this is not the same horizontal sync pulse in every frame; instead, the particular single horizontal sync pulse deleted from each frame varies from frame to frame, and can be in any one of lines 3–9. This frame to frame variation may be, for instance, random or pseudo random or follow some particular fixed pattern.

The third method, shown in FIG. 2F, does not delete horizontal sync pulses but instead adds them, so that each particular horizontal line includes, in addition to the normal single horizontal sync pulse at the beginning of the line, for instance three extra horizontal sync pulses inserted during the remainder of the line during, in this case, each of lines 1–7. This increased density of horizontal sync pulses for instance might be the same for every frame or may vary frame-to-frame, and need not be present in each frame. This causes playability problems on some monitors as described above. Adding some sync pulses therefore is compensated for by subtracting some others. Therefore, this method works best in conjunction with either the first or the second method described above.

The fourth method, shown in FIG. 2G, adds one horizontal sync pulse at a location varying between lines 0 and 1. The added horizontal sync pulse is added e.g. in the middle of the line. The line at which the horizontal sync pulse is added may vary from frame to frame either in a fixed pattern or randomly or pseudo randomly.

The fifth method, shown in FIG. 2H, pulse-width modulates the horizontal sync pulses in the VBI. (FIG. 2H is not to the same scale as FIG. 2A to 2G.) The horizontal sync pulse widths may vary between two or more individual discrete values at any frequency ranging from 1 sync pulse width change per several frames to 1 sync pulse width change per line. The sync pulse width may be altered by keeping the pulses leading edge in the standard location and moving the pulse trailing edge. Note that the location of the entire horizontal sync pulse may be varied, by varying the location of both the trailing and leading edges. Not all horizontal sync pulses in the VBI need be so modulated. A compromise between playability and effectiveness has been found to jump between the standard pulse width and 5 to 10% wider than standard every several frames. Also, sync pulse width modulation may be applied only to a group of selected lines, such as only during the VBI.

Alternately the vertical sync pulses may be delayed or advanced by a sync pulse width or fraction thereof. Another modification is to add narrow width positive-going pulses inside particular horizontal sync pulses.

Turning the modifications on/off every few frames, combining several of these methods simultaneously, and switching between different methods every few frames is possible and some combinations of this type been found to increase copy protection effectiveness with various converters.

It is to be understood that these methods are only illustrative and various modifications and combinations of these methods are also contemplated within the scope of the invention. However, these particular patterns have been found to maximize copy protection effectiveness while minimizing playability problems across various commercially available VGA to NTSC to PAL converters and VGA monitors.

As noted above, the presently disclosed anticopy protection scheme need not be identical frame-to-frame. For instance, the deletion of the horizontal sync pulses may vary from frame-to-frame in terms of the number and location. The same is true of adding horizontal sync signals as in FIG. 2G. In another variation, horizontal sync signals are both added and subtracted. For instance, one horizontal sync pulse may be deleted at a random location and another one added at a different location, e.g. in the middle of a line. One embodiment is to delete one horizontal sync pulse in one portion of the horizontal sync pulse train and add a horizontal sync pulse at a different portion of the horizontal sync pulse train in each VBI. In another embodiment, one horizontal sync pulse is deleted and two horizontal sync pulses are added per VBI.

It has been found generally as discussed above that is undesirable for playability purposes to add one or more horizontal sync pulses over the normal number per frame without deleting a corresponding number or greater somewhere else in the frame. In this case, the FIG. 2F embodiment may be problematic with certain VGA monitors.

One variation that has been found to be particularly effective and provide good playability involves the combination of the FIG. 2E and FIG. 2G methods. That is, a horizontal sync signal is deleted from either the 0 or first line as shown in FIG. 2G and a horizontal sync signal is added, e.g. in the middle of the line, in for instance line 8 as in FIG. 2E. The variation between the deletion in lines 0 and 1 is varied frame-to-frame so that there are three states; the first state there is no deletion, in the second state, the horizontal sync is deleted from line 0; and in the third state, the horizontal sync is deleted from line 1. The state variation frame-to-frame may again be either a fixed pattern, randomly or pseudo randomly frame-to-frame. The above-described fifth method may be superimposed onto this composite method to increase effectiveness.

Figure 3:
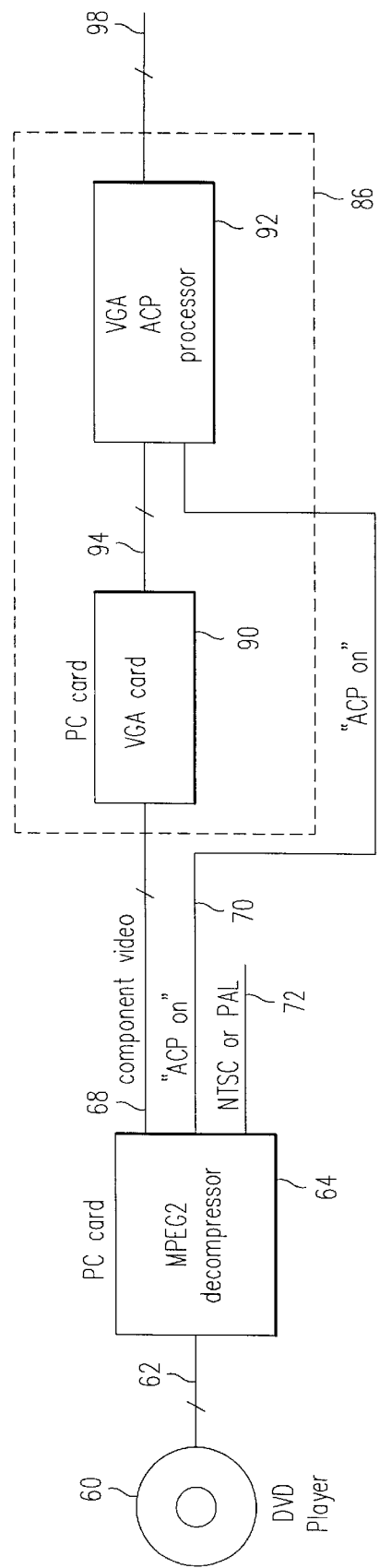
FIGS. 3 and 4 show high level block diagrams of how copy protection is applied in accordance with this invention.

FIGS. 3–6 illustrate one embodiment of circuitry for carrying out protection in accordance with this invention. FIG. 3 is a high level block diagram showing the relevant computer and video components. In a typical example, all of the elements shown in FIG. 3 are incorporated within the housing of a personal computer, although this is not limiting.

Of course, only the relevant portions of the personal computer are shown for purposes of simplicity. The conventional DVD player 60 plays a conventional DVD. This player 60 is shown pictorially as a disc. The present invention is not limited to output from a DVD player, but in fact is applicable to all VGA output signals. However, it is contemplated that a typical commercial embodiment is to copy protect copyrighted material provided on a DVD.

The signal output by the DVD player 60 is coupled via a conventional bus 62 to an MPEG2 decompressor 64 which is typically a card installed in the personal computer and is of a commercially available type. Decompressor 64 outputs component video on a bus 68. Moreover, the decompressor 64 outputs an "ACP on" signal on line 70, and on line (e.g. coaxial cable) 72 outputs an NTSC/PAL analog video signal for connection to a television set or VCR. ("ACP" refers to anti-copy protection", the same as copy protection.) As described above, typically this NTSC or PAL analog video signal is copy protected in the analog domain by the above-described well known copy protection methodology.

The component video on bus 68 and the "ACP on" signal are coupled into a VGA card 90. VGA card 90 includes conventional VGA processing circuitry which converts the component video into the desired VGA format and is a commercially available type of product. The VGA card 90 together with the VGA ACP (anticopy protection) processor 92 together may be integrated into a single card 86 or otherwise interconnected as shown. The VGA card 90 outputs on bus 94 the VGA video to the VGA ACP processor 92 which is the novel element shown in FIG. 3 in accordance with this invention.

The "ACP on" signal on line 70 is similarly coupled to the VGA ACP processor 92. In this case, in order for a user to connect to the output signal of the VGA card 90 an external NTSC/PAL device which is a VGA to NTSC/PAL converter, the user must couple the external device to the VGA output bus 98.

Of course, if the user were to tap into the bus 94, he could bypass the VGA ACP processor completely and thus bypass the present protection process. It is anticipated that the typical user will not do this. Moreover, if the VGA card 90 and the VGA ACP processor 92 for instance are incorporated together on a single integrated circuit chip, such tapping would be rendered virtually impossible, especially since the intermediate bus 94 can be omitted. In this case, a protected signal is generated to begin with in the VGA card 90 and the standard VGA signal never exists in this implementation.

The signal on the ACP on line 70 turns the VGA ACP processor 92 on. The absence of such signal on line 70 turns the processor 92 off and no protection is provided. Hence, the material on the DVD being played on player 60 determines whether the anticopy protection in accordance with this invention is applied or not. The protection may be selectively turned on and off depending on the video material.

Figure 4:
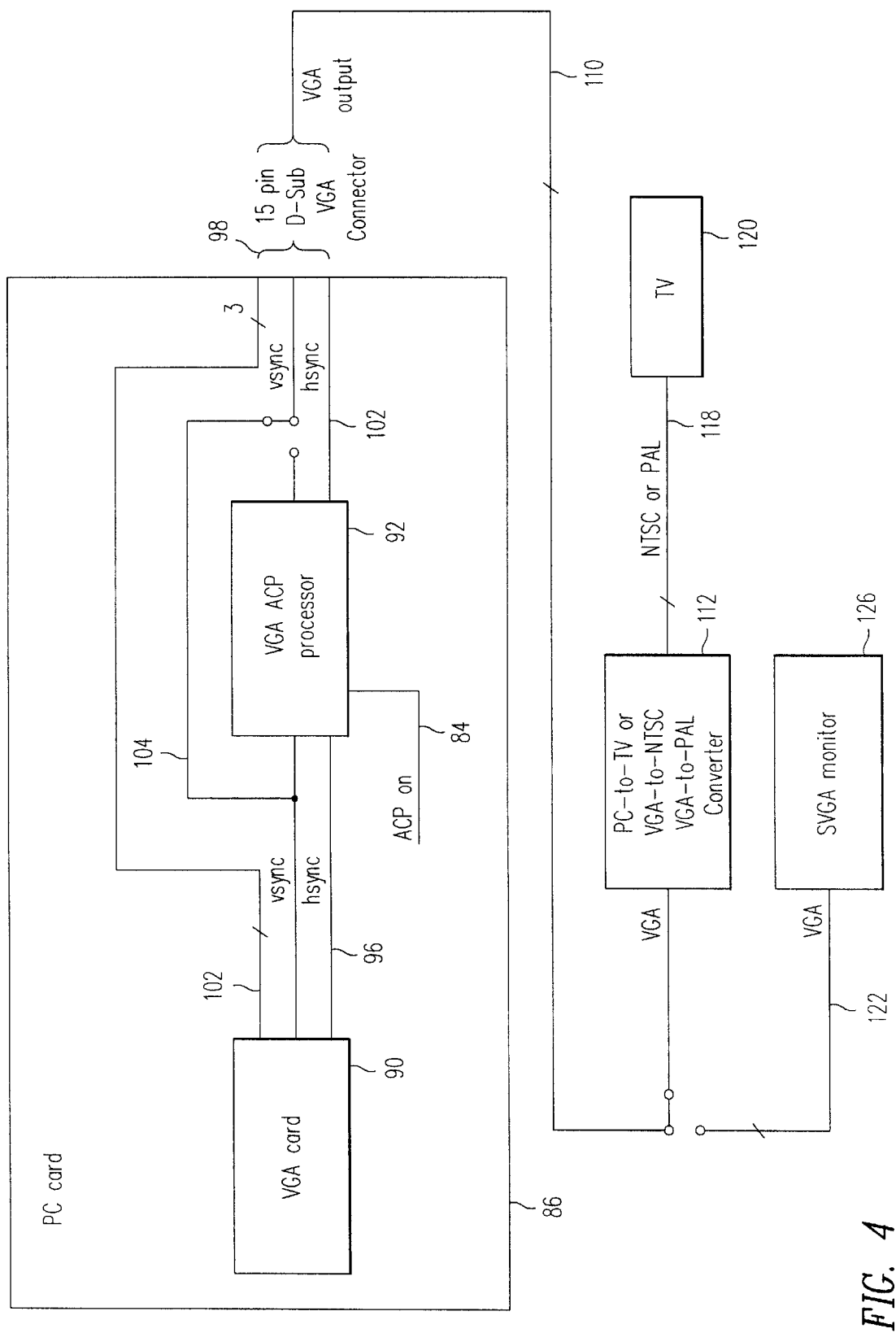

FIG. 4 shows a more detailed view of selected elements of FIG. 3, including the PC card 86, the VGA card 90, and the VGA ACP processor 92. As shown, the bus 94 in FIG. 3 includes bus 102 which carries the RGB three component video, as well as a vertical sync line 104 and a horizontal sync line 99. Together these comprise the VGA video, with additional conventional lines which include various ground lines etc. and are not shown for simplicity. As shown, the lines 102 and 104 bypass the VGA ACP processor 92 in this embodiment. A jumper is available as shown so that the vertical sync line 104 may be altered by processor 92 if desired. However, since the typical embodiments disclosed herein modify the horizontal sync pulses, in this case only the horizontal sync signal on line 102 is actually modified by the processor 92.

The output signals from the PC card 86 are provided on a VGA connector 98 which is coupled via a bus 110 to a NTSC/PAL converter. Converter 112 is typically a personal computer to NTSC/PAL television converter usually of the type commercially available. These are typical after market devices and as shown are not a portion of the computer, although of course they could be incorporated in the computer as a card. As shown, the output signals from the converter 112 are provided on a line 118 to a conventional television set or monitor 120. The VGA output signal is also connected directly (if desired) to the standard VGA monitor 126 by bus 122. As shown, the connection to the converter 112 and the monitor 126 is selective, depending on which device is plugged into the VGA output port 98.

Figure 5:
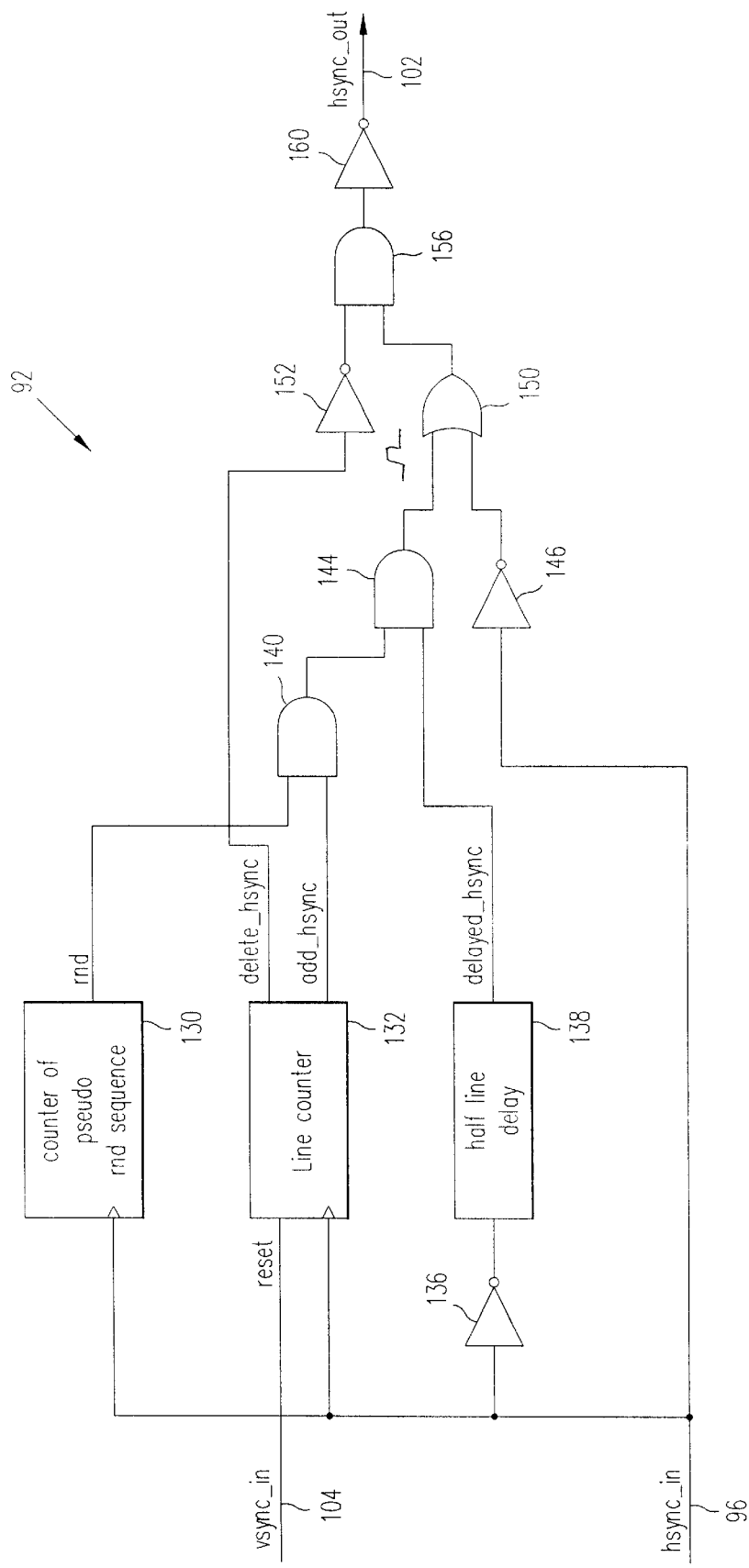
FIGS. 5 and 6 show detail of FIGS. 3 and 4.

The present protection process is provided by the processor 92 shown in greater detail in FIG. 5. Elements in FIG. 5 similar to those in the other figures are identically labeled. The input signals to the ACP processor 92 include the vertical sync pulses on line 104 and the horizontal sync pulses on line 96.

Counter 130 counts the input horizontal sync pulses on line 96 and pseudo-randomly outputs an output labeled RND. Line counter 132 receives a horizontal sync pulses on line 96 as well as the vertical sync signal on line 104 which acts as a counter reset. The horizontal sync pulses on line 96 are counted by line counter 132 as described, in further detail below. The output signals from line counter 132 are a signal "delete hsync" on one line indicating deletion of horizontal sync and a signal "add hsync" on another line indicating addition of horizontal sync.

The third main element in FIG. 5 is a half line delay 138 also driven by the horizontal sync pulses on line 96 as inverted by inverter 136. This provides a one-half line delay of the inverted horizontal sync pulses on the output line "delayed hsync". As shown, the four output signals from elements 130, 132 and 138 are combined by logic gates 140 through 160 to provide a horizontal sync signal "hsync out" on line 102. This is a modified horizontal sync pulse train and in effect replaces the original horizontal sync pulse train on line 96.

This particular circuit therefore has a facility for deleting horizontal sync pulses and adding horizontal sync pulses. The added pulses are added in the middle of a line, hence the half line delay 138. FIG. 5 is better understood with reference to FIG. 6 which shows the detail of line counter 132. The horizontal sync signal in on line 96 clocks a 480 line counter 170 which counts from 1 to 480 and outputs a 9-bit (digital) output signal indicating the line count. This output signal is applied to the a input terminals of three comparators 174, 176 and 180. As shown, the b input terminal of each of the comparators 174, 176, 180 is respectively connected, either programmably or hardwired, to a digital value respectively of 4, 1 and 2.

Figure 6:
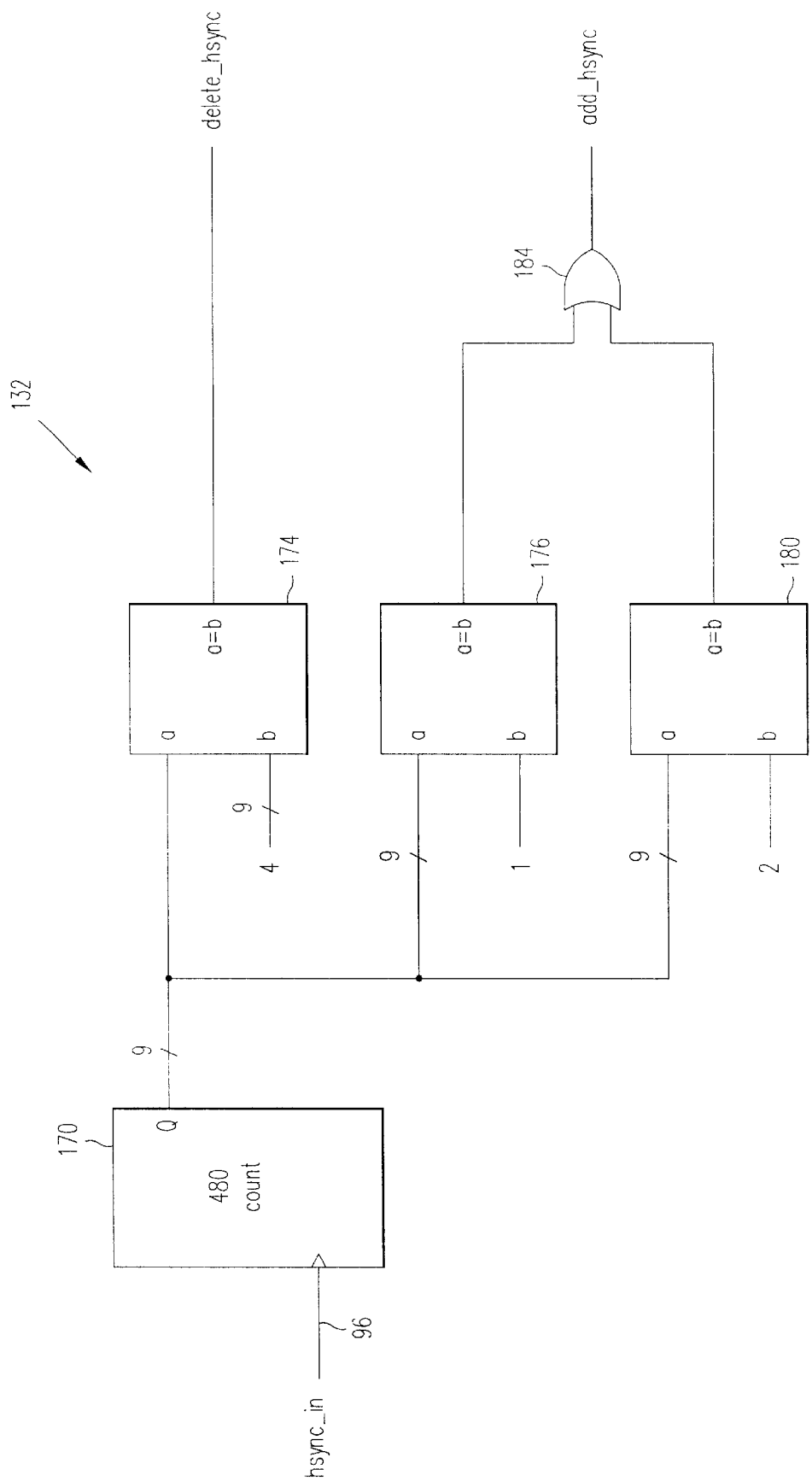

The output signal from the comparator 174 is the delete hsync signal also shown in FIG. 5, while the outputs of comparators 176 and 180 are combined by the OR gate 184 to provide the add sync signal. Since the add sync signal in FIG. 5 is modified by the random signal and, the effect is that a horizontal sync pulse is pseudo-randomly added, its location varying with each frame so that there are three states; in the first state no horizontal pulse is added, in the second state it is added on line 1 in the VBI, and in the third state it is added on line 2 of the VBI. The value 4 input to comparator 174 indicates that the horizontal sync pulse in this case is deleted on line 4. Of course each of these values (4, 12) can vary by varying the location of the deletion/addition. Hence FIGS. 5 and 6 are merely illustrative of one embodiment of a copy protection circuit in accordance with this invention.

As indicated above, in addition to the method and apparatus for VGA protection, the present inventors have discovered a method and apparatus for defeating their protection system. This is analogous to the defeat approach to defeat the analog copy protection described above; examples of such defeat approaches for analog video are shown in U.S. Pat. Nos. 5,194,965, 4,695,001, and 5,633,927, incorporated herein by reference. One present defeat method is to couple between the modified VGA signal output from processor 92 and the input to converter 112 a circuit that inputs the modified sync pulse trains to trigger a pulse generator to produce pulse trains not containing any of the deleted or added lines.

Figure 7A:
FIG. 7A, 7B show a copy protection defeat method and an associated diagram of a copy protection defeat circuit.

One such defeat method is shown, in terms of waveforms, in FIG. 7A. This illustrates detecting the leading (negative) edge of the vertical sync pulse (top waveform) in each frame, giving a pulse at this leading negative edge (second waveform). This once per frame pulse is used to generate a series of pulses at the correct horizontal line rate (third waveform) which in turn trigger regenerated horizontal sync pulses of the correct length at the correct locations (fourth waveform).

Figure 7B:
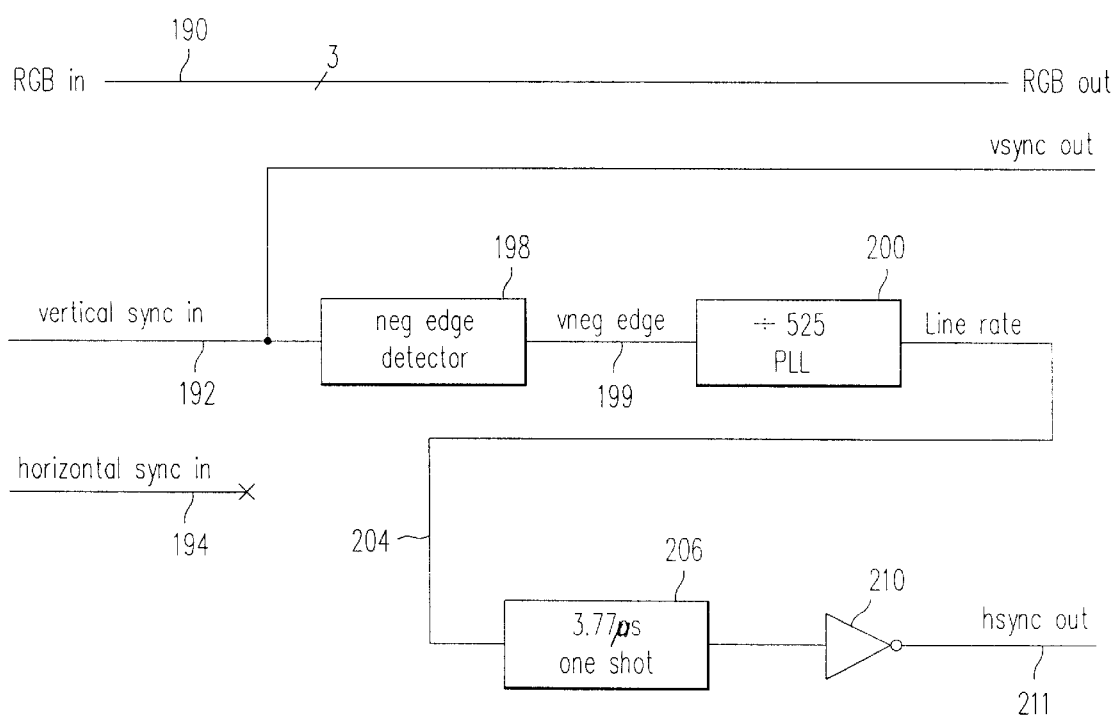

The associated defeat circuit is shown in FIG. 7B. The protected (modified) VGA video is coupled to RGB port 190 and lines 192, 194. The input vertical sync pulse train on line 192 (which is not modified) triggers negative edge detector 198 to output the vertical negative edge pulse on line 199 which drives a divide by 525 phase lock loop 200. In this case, there are 525 lines per frame. PLL 200 outputs the line rate pulses of FIG. 7A (third waveform) on line 204 to drive a 3.77 microsecond duration one shot 206 which outputs, after inversion by inverter 210, the regenerated (correct) horizontal sync pulse train (fourth waveform of FIG. 7A) on line 212.

Figure 8:
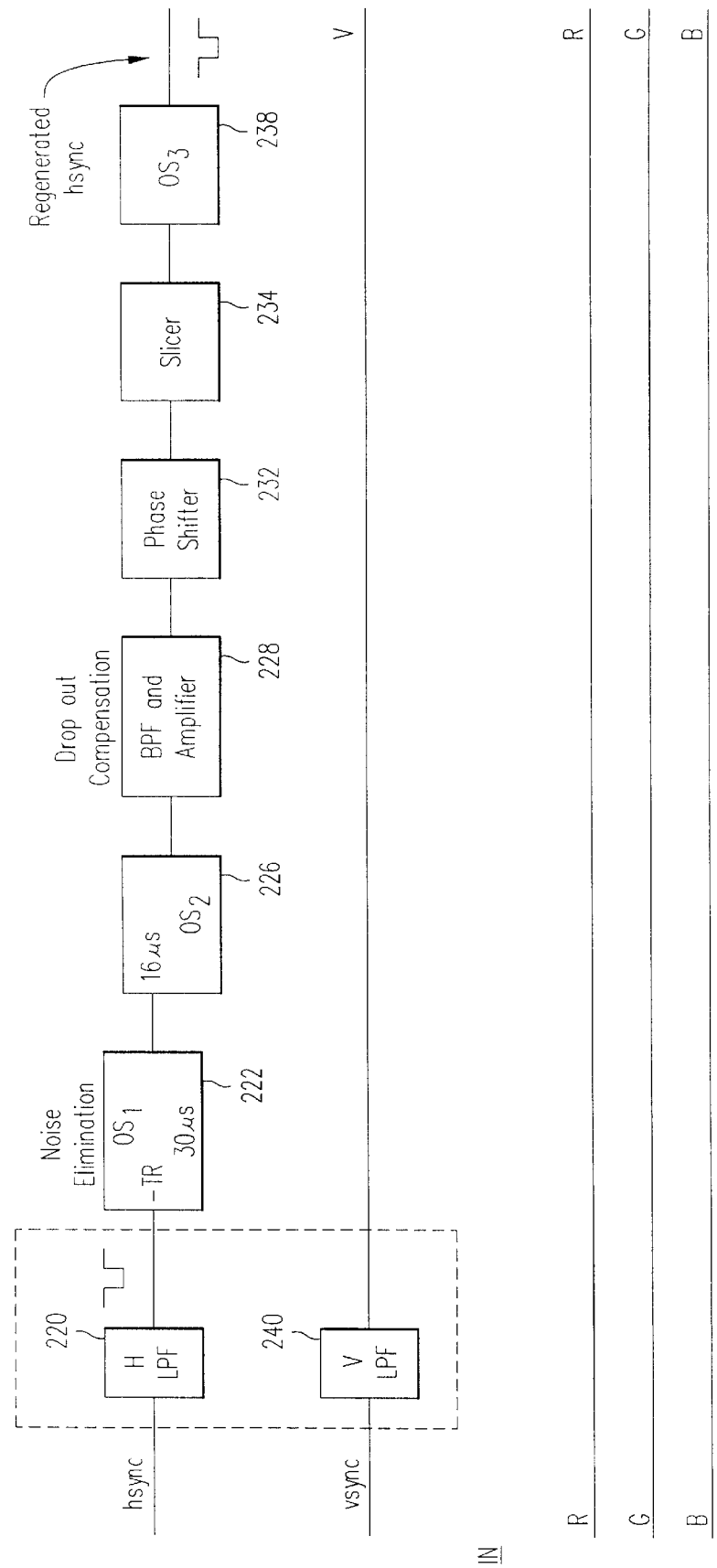

The circuit of FIG. 8 defeats the present VGA protection by using a fly-wheel filter to ignore added pulses in the horizontal sync train and also to fill in missing horizontal sync pulses. The vertical sync pulse train is optionally filtered if noise signals are present as part of the protection scheme.

With reference to FIG. 6, the horizontal sync pulse train is regenerated such that normal horizontal sync pulses are reestablished. This is done by first filtering out any noise signals in the input horizontal sync (hsync) with H LPF 220, a low pass filter that passes through horizontal sync pulses. The output signal from low pass filter 220 then is coupled to the trigger input at a one shot circuit 222 (OS1) that is non-retriggerable. This one shot 222 outputs a pulse that is about 90% to 99% (30 μsec)the duration of a horizontal pulse period, so that any further noise or protection signals in the active portion of the horizontal sync pulse train are ignored. The output signal of one shot 222 then is running at horizontal rate, except whenever a horizontal sync pulse deletion caused by the protection occurs. The output of one shot 222 then is shaped (optionally) by one shot 226 (OS2) which generates about a 50% duty cycle horizontal rate pulse (16 μsec duration).

The output of one shot 226 then is filtered via a bandpass filter/amplifier 228 of high Q such that ringing occurs with an impulse or step signal, providing dropout compensation. The amplified output is coupled to a phase shifter 232 to match the phase of the input horizontal sync pulses. The output of the phase shifter 232 is then translated to logic levels by slicer 234 and then coupled to one shot 238 (OS3) to set the pulse duration of the new regenerated horizontal sync pulses at their nominal value, tree of protection due to deleted or added sync pulses. As shown, the vertical sync pulses are optionally subject to vertical low pass filter 240.

If noise is present or modifications are done to the vertical sync pulses, the modified vertical sync pulses can be made free of copy protection by using the same type of method as described above for horizontal sync pulses. That is, one uses a fly-wheel filter tuned to vertical rate to regenerate the copy protected vertical syncs.

Figure 9:
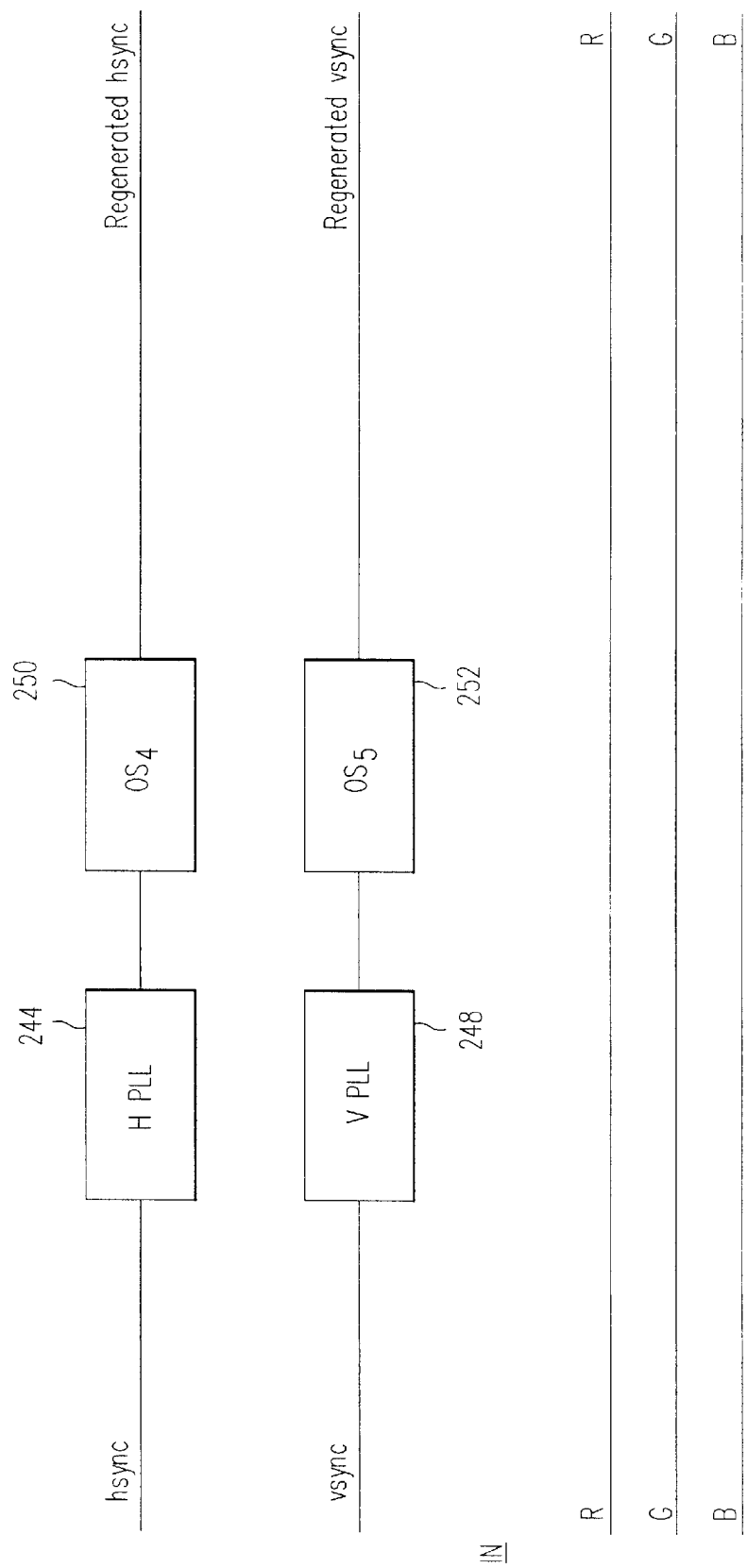

FIG. 9 shows a circuit for removing the added or deleted signals (i.e. sync pulses) for the horizontal and/or the vertical sync pulse trains by using respectively phase lock loop circuits 244, 248 to defeat the copy protection signals. The respective one shot circuits 250 (OS4) and 252 (OS5) define corresponding output pulse widths respectively.

Figure 10:
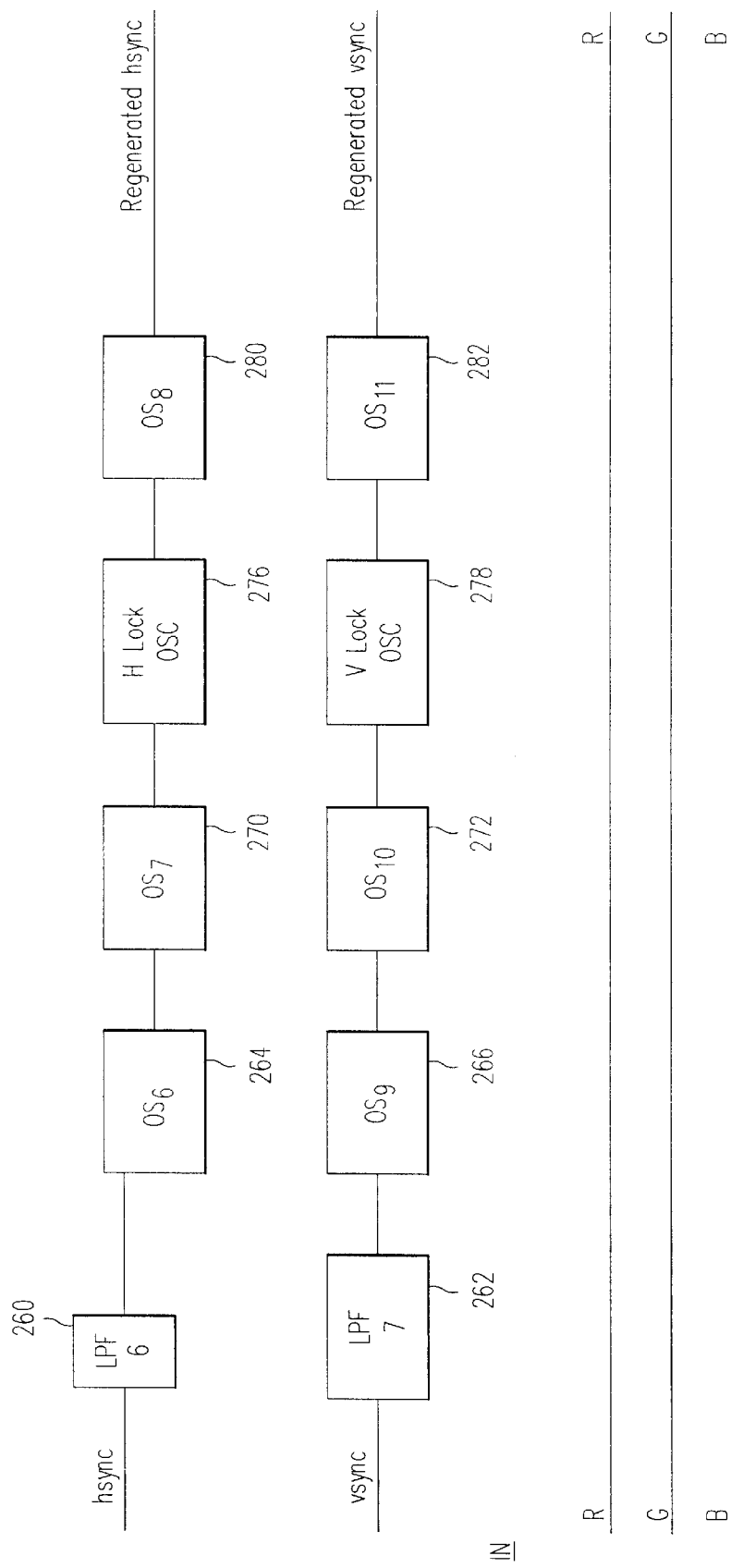

FIG. 10 shows yet another fly-wheel circuit to remove the protection. Instead of using phase lock loop circuits, lock oscillators are used. These lock oscillators can be triggered oscillators for example. The lowpass filter 260 (LPF6) and 262 (LPF7) remove some of the noise that may be present in respectively the horizontal and vertical sync pulse trains. One shot circuits 264 (OS6) and 266 OS9 are non-retriggerable one shots with a duration of 90% to 99% of the horizontal and vertical sync pulse periods respectively. Thus, one shot 264 and one shot 266 reject noise or protection pulses in the horizontal and vertical sync pulse trains coincident with the active video. One shots 270 (OS7) and 272 (OS10) shape the pulses output by one shots 264, 266 respectively and allow the horizontal lock (H lock) and vertical lock (V lock) oscillators 276, 278 to synchronize with the incoming sync pulses. One shots 280 (OS8) and 282 (OS11) set pulse widths consistent with nominal horizontal and vertical sync pulses that are free of copy protection.

Figure 11:
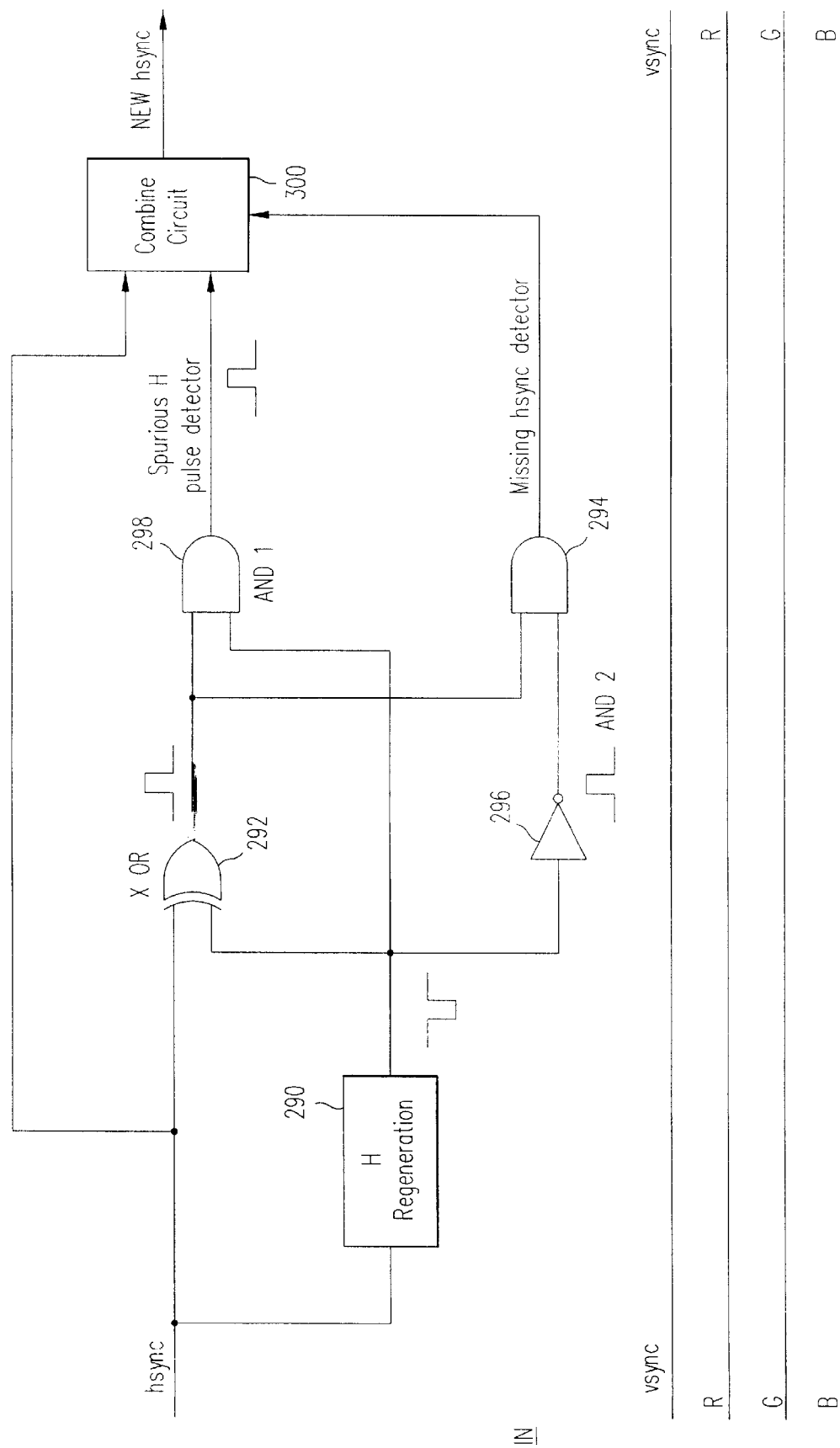

FIG. 11 shows another circuit to defeat the protection by detecting the added sync pulses and the missing sync pulses. Once the missing sync pulse periods are identified, a new sync pulse is re-inserted or added back to the horizontal sync pulse train. If spurious sync signals are found, then the horizontal sync pulse train containing these will be modified such that these spurious horizontal sync pulses are narrowed attenuated, level shifted, or any combination of such that the spurious horizontal signals are not detected by the VGA (or equivalent) converter.

In the defeat circuit of FIG. 11, the protected horizontal sync pulse train is input to a horizontal sync regeneration circuit 290 (as described above) which outputs standard horizontal sync pulses. The regeneration circuit 290 can be a circuit such as in FIG. 8 or equivalent. The output signal of regeneration circuit 290 is input to one input terminal of an XOR (exclusive OR) gate 292. The output signal of XOR gate 292 turns high when there is a missing (deleted) horizontal sync pulse and also turns high when spurious sync pulses (added horizontal sync pulses) are present. To identify or sense missing horizontal sync pulses, the output signal of the XOR gate 292 is coupled to an input terminal of AND gate 294 (AND2), whose other input terminal is coupled to the inverted regenerated horizontal synchronization signal via inverter 296.

The output signal Qf AND gate 294 is high when deleted horizontal sync pulses occur. To identify (sense) the added (spurious) horizontal sync pulses of the copy protected signal, the output signal of XOR gate 292 is connected to an input terminal of AND gate 298 (AND1). The other input terminal of AND gate 298 is coupled to the output signal of the regeneration circuit 290. Since the output signal of the regeneration circuit 290 is low during the horizontal sync pulse tips, the output signal of AND gate 298 can be high only during the times outside the interval of the horizontal sync pulses. It turns out that the added or spurious horizontal sync pulses occur in the interval outside the normal horizontal sync pulses. Therefore, the output signal of AND gate 298 is logic high during the interval of added horizontal sync pulses.

To defeat the copy protection signal, the output signal of AND gate 294 is combined (i.e. logically OR'd) with the horizontal sync pulse train to add back in the missing horizontal sync pulses. To defeat the added (spurious) horizontal sync pulses, the combining circuit 300 uses the output signal of AND gate 298 to do any or combination of the following:

a) Narrow the pulse width of the spurious horizontal sync pulses such that the protection is defeated.

b) Level shift at least a sufficient portion of the added horizontal sync pulses relative to the horizontal sync pulses such that the protection signal is defeated.

c) Attenuate at least a sufficient portion (includes elimination of the added pulses) of the added horizontal sync pulses relative to the normal horizontal sync pulses such that the protection signal is defeated.

d) Any combination of the above a, b, and/or c. Thus, the output signal of the combining circuit 300 then is the horizontal sync pulse train ("New H") free of the protection signal.

If the vertical sync signal, V sync, has protection modifications, it too can be defeated similarly as described above for the horizontal sync pulses. Otherwise, the vertical sync pulses and video signals R, G, and B are sent to the output substantially unchanged.

On the other hand, if the horizontal blanking intervals of the video channels (i.e. red, green and blue or R, G, and B) contain the anticopy signals, then defeating can be done by any of the following:

a) Replacing and/or attenuating a sufficient portion of the protection signal in or near the horizontal blanking interval over a sufficient number of horizontal lines in the video channels with a new signal such as a blanking level voltage.

b) Level shifting a sufficient portion of the protection signal over a sufficient number of horizontal lines; for example, level shifting a peak white copy protection signal down to blanking level.

c) Narrowing or increasing the frequency of the protection signal (to lower its energy) sufficiently such that the computer monitor's clamp pulse will not respond to the resultant lower energy protection signals.

d) any combinations of the above a to c.

The above description is illustrative and not limiting; other modification in accordance with the invention will be apparent to one of ordinary skill in the art in the light of this disclosure and are intended to fall with the scope of the appended claims.

We claim:

1. A method of protecting a component video signal from unauthorized use, comprising the steps of:

modifying a synchronization signal of the component video signal by adding or deleting synchronization pulses in the component video signal;

wherein the modified component video signal when played on a component video monitor produces a normal image, and the modified component video signal when converted to a composite video signal produces an image having degraded viewing characteristics.

2. The method of claim 1, wherein the component video signal is one of a VGA, SVGA, IBM XGA or other computer video signal.

3. The method of claim 1, wherein the composite video signal is one of an NSTC, SECAM, or PAL video signal.

4. The method of claim 1, wherein the step of modifying comprises adding or deleting at least one horizontal synchronization pulse of at least particular frames of the component video signal.

5. The method of claim 4, wherein the adding or deleting is at a location between the first horizontal line of the vertical blanking interval and the vertical sync pulse of each of the particular frames.

6. The method of claim 4, wherein at least one horizontal synchronization pulse is added at a first location and at least one horizontal synchronization pulse is deleted from a second location.

7. The method of claim 4, wherein the added horizontal synchronization pulse is added at a location other than the beginning of a horizontal scan line.

8. The method of claim 4, further comprising the step of varying a position of the horizontal synchronization pulse which is added or deleted from frame-to-frame.

9. The method of claim 8, wherein the varying is random.

10. The method of claim 8, wherein the varying is pseudo random.

11. The method of claim 8, wherein the varying is in a fixed pattern from frame to frame.

12. The method of claim 1, wherein the step of modifying comprises adding a plurality of closely spaced horizontal synchronization pulses.

13. The method of claim 1, further comprising the steps of:

prior to the step of modifying, determining if a copy protection trigger signal is present in the component video signal; and only performing the step of modifying if the trigger signal is determined to be present.

14. The method of claim 1, further comprising the step of:

both deleting and adding horizontal synchronization pulses in each frame.

15. The method of claim 1, further comprising the steps of:

determining characteristics of the component video monitor; and adaptively modifying the synchronization signal, dependent on the determined characteristics, to ensure production of the normal image.

16. The method of claim 1, wherein the step of modifying comprises pulse-width modulating a plurality of horizontal synchronization pulses.

17. The method of claim 1, further comprising the steps of periodically stopping the step of modifying.

18. The method of claim 1, wherein the step of modifying includes periodically switching between differing versions of the method.

19. The method of claim 1, wherein the added pulses are in a horizontal blanking interval of the component video signal.

20. The method of claim 1, wherein the added or deleted pulses are in a vertical blanking interval of the component video signal.

21. An apparatus for protecting a component video signal from unauthorized use, comprising:

a circuit having two input terminals for receiving respectively a vertical synchronization signal and a horizontal synchronization signal of the component video signal, and outputting a modified vertical or horizontal synchronization signal that when supplied to a component video monitor produces a normal image, and when converted to a composite video signal produces an image having degraded viewing characteristics.

22. The apparatus of claim 21, wherein the component video signal is one of a VGA, SVGA, IBM XGA, or other computer-type video signal.

23. The apparatus of claim 21, wherein the composite video signal is one of an NSTC, SECAM, or PAL video signal.

24. The apparatus of claim 21, wherein the circuit modifies the video signal by adding or deleting at least one horizontal synchronization pulse in the vertical blanking interval of at least particular frames of the component video signal.

25. The apparatus of claim 24, wherein the adding or deleting is at a location between the first horizontal line of the vertical blanking interval and the vertical sync pulse of each of the particular frames.

26. The apparatus of claim 24, wherein at least one horizontal synchronization pulse is added at a first location and at least one horizontal synchronization pulse is deleted from a second location.

27. The apparatus of claim 24, wherein the added horizontal synchronization pulse is added at a location other than the beginning of a horizontal scan line.

28. The apparatus of claim 24, wherein the circuit varies a position of the horizontal synchronization pulse which is added or deleted from frame to frame.

29. The apparatus of claim 28, wherein the varying is random.

30. The apparatus of claim 28, wherein the varying is pseudo random.

31. The apparatus of claim 28, wherein the varying is in a fixed pattern from frame to frame.

32. The apparatus of claim 21, wherein the circuit adds a plurality of closely spaced horizontal synchronization pulses.

33. The apparatus of claim 21, wherein the apparatus further comprises:

means for determining if a copy protection trigger signal is present in the component video signal.

34. The apparatus of claim 21, wherein the circuit adds and deletes horizontal synchronization pulses in one frame of the component video signal.

35. The apparatus of claim 21, wherein the circuit pulse-width modulates horizontal synchronization pulses in the composite video signal.

36. The apparatus of claim 21, further comprising:

means for determining characteristics of the component video monitor; and means for adaptively modifying the synchronization signal, dependent on the determined characteristics, to ensure production of the normal image.

37. The apparatus of claim 24, wherein the circuit includes:

a line counter coupled to be reset by vertical synchronization pulses in the input vertical synchronization signal, and counting the horizontal synchronization pulses in the horizontal synchronization signal;

a sequence counter coupled to count the horizontal synchronization pulses;

a half-line delay coupled to receive the horizontal synchronization pulses; and a logic circuit coupled to receive output signals from each of the line counter, sequence counter, and half-line delay and outputting the modified horizontal synchronization signal.

38. The apparatus of claim 24, wherein the circuit is periodically turned off.

39. The apparatus of claim 24, wherein the circuit periodically switches between different versions of the modified synchronization signal.

40. The apparatus of claim 24, wherein the modified synchronization signal is in a horizontal blanking interval of the component video signal.

41. The apparatus of claim 24, wherein the modified synchronization signal is in a vertical blanking interval of the component video signal.

\* \* \* \* \*